(12) United States Patent
Isono et al.

(10) Patent No.: US 6,493,297 B1
(45) Date of Patent: Dec. 10, 2002

(54) MULTIBEAM OPTICAL DISK RECORD AND REPRODUCTION APPARATUS AND METHOD

(75) Inventors: Soichi Isono, Yokohama (JP); Satoshi Kawamura, Yokohama (JP); Kiyoshi Honda, Yokohama (JP); Toshimitsu Kaku, Sagamihara (JP); Hitoshi Komatsu, Kanagawa-ken (JP); Yuji Yamane, Odawara (JP); Yasushi Fukuda, Odawara (JP); Toshio Niihara, Sayama (JP); Hiroshi Ide, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/056,812

(22) Filed: May 4, 1993

Related U.S. Application Data

(63) Continuation of application No. 07/697,603, filed on May 9, 1991, now abandoned.

(30) Foreign Application Priority Data

May 9, 1990 (JP) ............................................. 2-117575

(51) Int. Cl.[7] ........................ G11B 7/095; G11B 7/0045
(52) U.S. Cl. .................................. 369/44.37; 369/53.36
(58) Field of Search ............................... 369/44.37, 54, 369/58

(56) References Cited

U.S. PATENT DOCUMENTS 4,494,226 A * 1/1985 Hazel et al. .............. 399/58 X
5,010,337 A * 4/1991 Ohkuma et al. .......... 369/54 X

FOREIGN PATENT DOCUMENTS

JP          0160305     * 12/1980     .................. 369/58

* cited by examiner

Primary Examiner—Aristotelis Psitos
Assistant Examiner—D. Wilkinson
(74) Attorney, Agent, or Firm—Antonelli, Terry, Stout & Kraus

(57) ABSTRACT

Multibeam optical disk record and reproduction apparatus and method, in which at least two light beams generated are concentrated in different positions of on recording tracks of a recording medium to record or reproduce data to or from the recording medium on the different positions at the same time. The light beams are moved independently of each other across the recording tracks so that any one light beam is movable during the recording or reproducing of data by another light beam. This allows parallel recording/reproducing with a plurality of light beams without producing areas unaccessed due to the jumps of the light beams.

18 Claims, 11 Drawing Sheets

MULTIBEAM OPTICAL DISK RECORD AND REPRODUCTION APPARATUS AND METHOD

This application is a continuation of application Ser. No. 07/697,603, filed May 9, 1991 now abandoned.

BACKGROUND OF THE INVENTION

1. Field of the Invention

The present invention relates to a multibeam optical disk record and reproduction apparatus and method in which data is recorded onto or reproduced from an optical disk with a plurality of light beams in parallel.

2. Description of the Background Art

A conventional optical disk record and reproduction method is known in which data are recorded onto or reproduced from an information recording medium such as an optical disk in parallel by using a plurality of light beams in order to increase READ/WRITE operation speed. An apparatus of this kind is reported in "Digest of Papers", 7th IEEE Symposium on Mass Storage Systems (1985), pp. 17–21.

In the conventional optical disk record and reproduction system, a particular recording disk dedicated for parallel recording using a plurality of light beams is required. Also, the system does not work effectively with a common optical disk for a single light beam.

Now referring to FIGS. 3 and 4, problems will briefly be described which arise when the reproducing of data from a conventional common recording disk is carried out by using a plurality of light beams. FIG. 3 shows a positional relationship between recording tracks T of a conventional recording disk and light spots of light beams such as beam 1 and beam 2 focused on the recording tracks T for recording and reproducing. Data is recorded on the spiral recording tracks T and a part of the spiral traced by a head H in one rotation of the recording disk is designated one track. A pair of light beams, i.e., beam 1 and beam 2 carry out recording and reproducing of adjacent two tracks, for example, with the head H on the tracks while the recording disk is turned in a direction indicated by an arrow A in FIG. 3.

FIG. 4 shows positions of beam 1 and beam 2 moving along the tracks with reference to elapsed time in the reproducing operation of a conventional system. As shown in FIG. 4, beam 1 starts the reproducing from the leading edge of the track n at the time t1 while beam 2 also starts the reproducing from the leading edge of the track n+1 at the time t1. At the time t2, beam 1 reaches the end of the track n and beam 2 reaches the end of the track n+1. Then, since the track n+1 is already reproduced by beam 2, beam 1 is jumped to the track n+2 and beam 2 is also jumped to the track n+3. However, it takes approximately several hundreds of μs (microsecond) for the jumps, and beam 1 and beam 2 start to the reproducing of the tracks n+2 and n+3 from the time t3. Accordingly, the head portions (indicated by hatching in FIG. 4) of the tracks n+2 and n+3 can not be reproduced between the times t2 and t3 during the jumps. In recording operation, the same problem arises. In case of three light beams or more light beams used, some areas remain unreproduced or unrecorded in jumping between the tracks in the same manner as described above.

SUMMARY OF THE INVENTION

It is therefore an object of the present invention to provide a multibeam optical disk record and reproduction apparatus, free from the drawbacks of the prior art, which is capable of preventing causing of not recorded or reproduced portions on a conventional recording disk, enabling data parallel processing in recording and reproducing operations, and improving an operation speed of the recording and reproducing.

It is another object of the present invention to provide a multibeam optical disk record and reproduction apparatus which is capable of carrying out an effective reproducing operation even for a recording disk which is apt to cause misreading.

In accordance with one aspect of the present invention, there is provided an optical disk record and reproduction apparatus, comprising means for generating at least two light beams, means for concentrating the light beams in at least two different positions of an information recording medium having at least one recording track for recording and reproducing data to and from the recording medium, and means for moving the positions of the light beams independently of each other across recording tracks on the recording medium, any one of the light beams being movable during recording or reproducing of data by another light beam.

In accordance with another aspect of the present invention, there is provided a multibeam optical disk record and reproduction method, comprising the steps of generating at least two light beams, concentrating the light beams on different positions of a plurality of recording tracks formed in a spiral line on a recording medium to record or reproduce data to or from the recording medium on the different positions at the same time, and moving the light beams independently of each other on the recording track.

In operation, one of a pair of recording/reproducing light spots is movable independently of the other light spot. This allows one light spot to continue, during a jump at by the other light spot, to reproduce or record data on a track, which precedes by one track the destination track of the jumping light spot so as to cover the area which the jumping light spot has left unreproduced or unrecorded. If this operation is applied to the example of FIG. 4, beam 2 continues to reproduce during a jumping of beam 1 so as to reproduce data of the area which otherwise beam 1 would leave unreproduced.

Thus, parallel recording/reproducing with a plurality of light spots can be achieved without producing areas unaccessed due to the jumps of the beams, thereby providing higher speed of recording/reproducing.

Further, when an error is detected in data reproduced by one light spot, the other light spot is jumped to the erroneous position of the recording disk to retry the reproducing, thereby providing effective reproduction even for a recording disk which is apt to cause misreading.

BRIEF DESCRIPTION OF THE DRAWINGS

These and other objects, features and advantages of the present invention will more fully appear from the following description of the preferred embodiments with reference to the accompanying drawings, in which.

DESCRIPTION OF THE PREFERRED EMBODIMENTS

Figure 1:
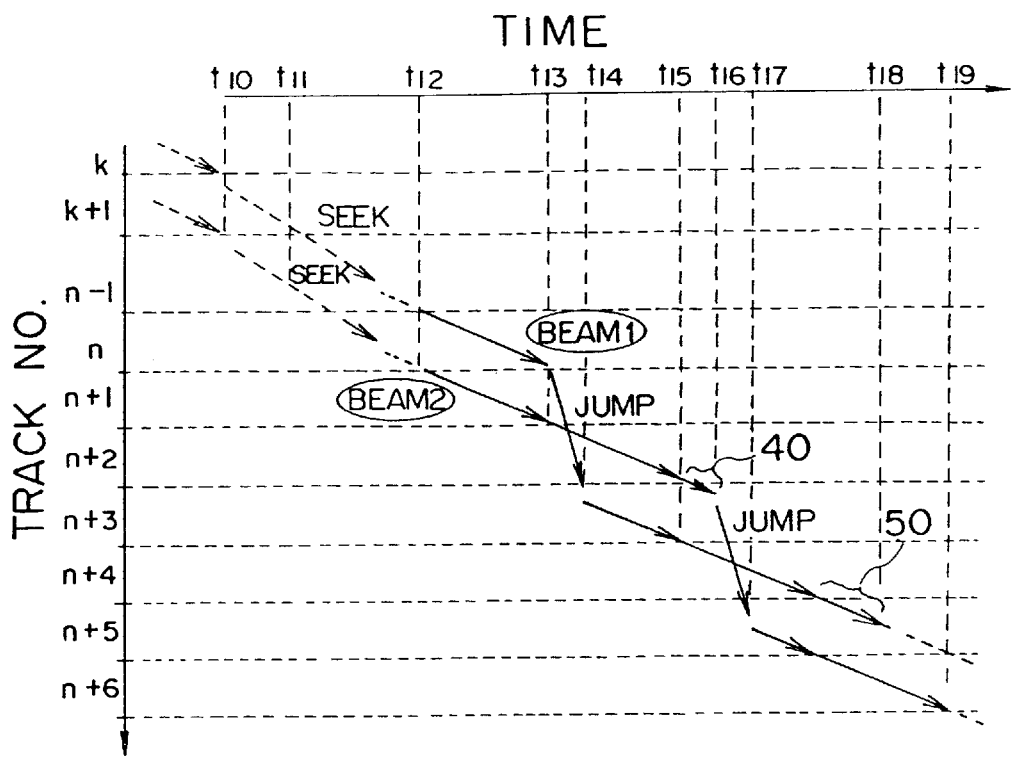
FIG. 1 is a schematic view showing a movement of two light beams along the tracks with reference to elapsed time in a recording operation in a first embodiment of an optical disk record and reproduction apparatus according to the present invention.
Figure 1:
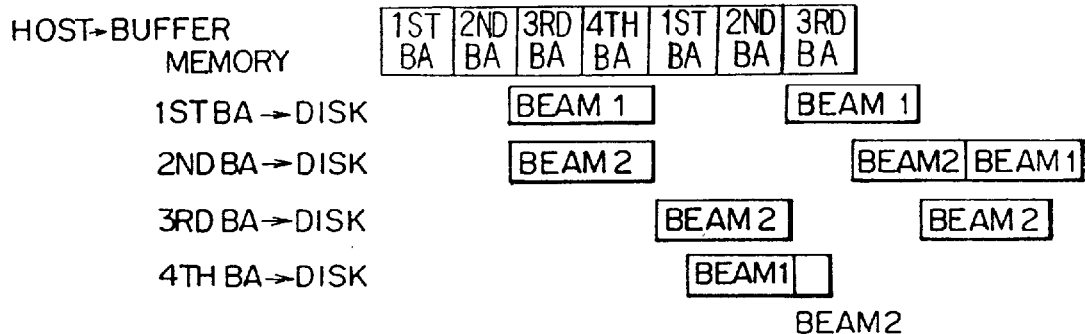

Referring now to the drawings, wherein like reference characters designate like or corresponding parts throughout the several views and thus the repeated description thereof can be omitted for the brevity, there is shown in FIGS. 1, 2, 5 to 10 the first embodiment of an optical disk record and reproduction apparatus according to the present invention.

Figure 2:
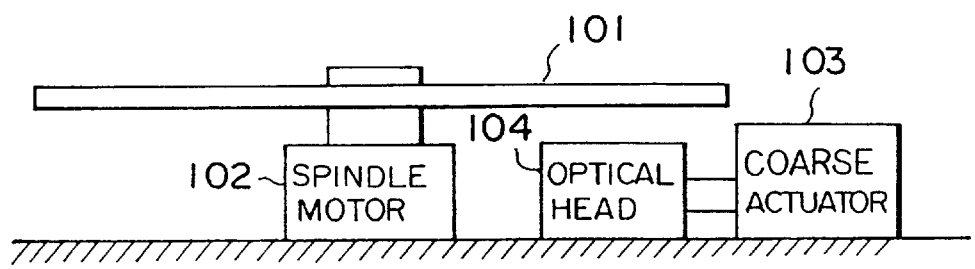
FIG. 2 is a schematic side view of a essential mechanical part of the first embodiment of an optical disk record and reproduction apparatus according to the present invention.
Figure 3:
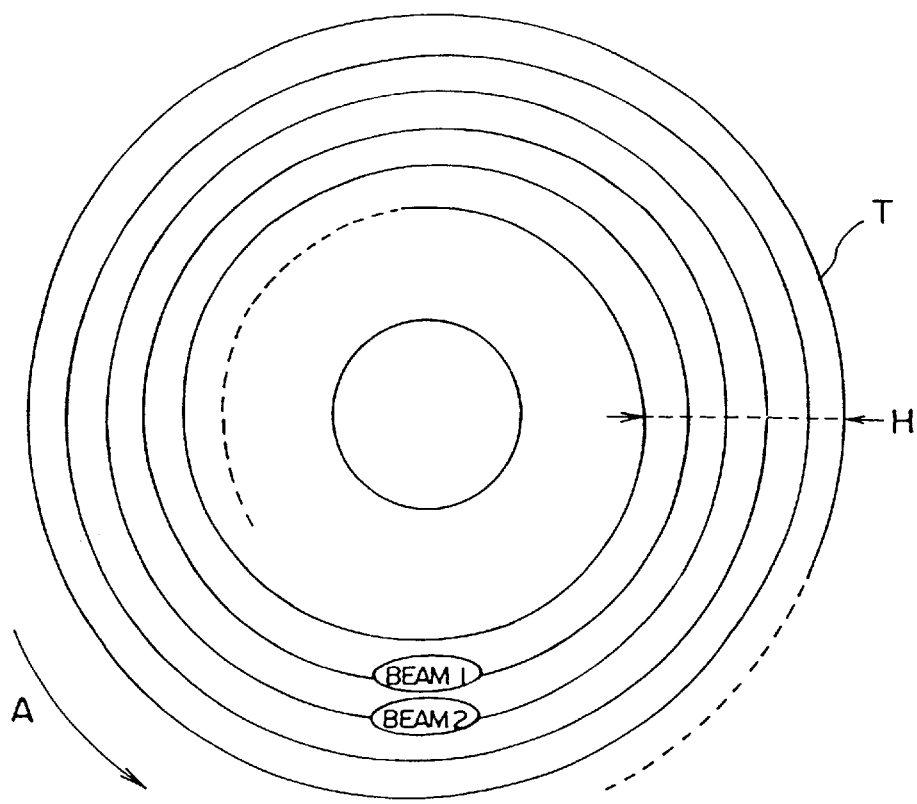
FIG. 3 is a schematic elevation of a conventional recording disk having tracks and light beams positioned thereon.
Figure 4:
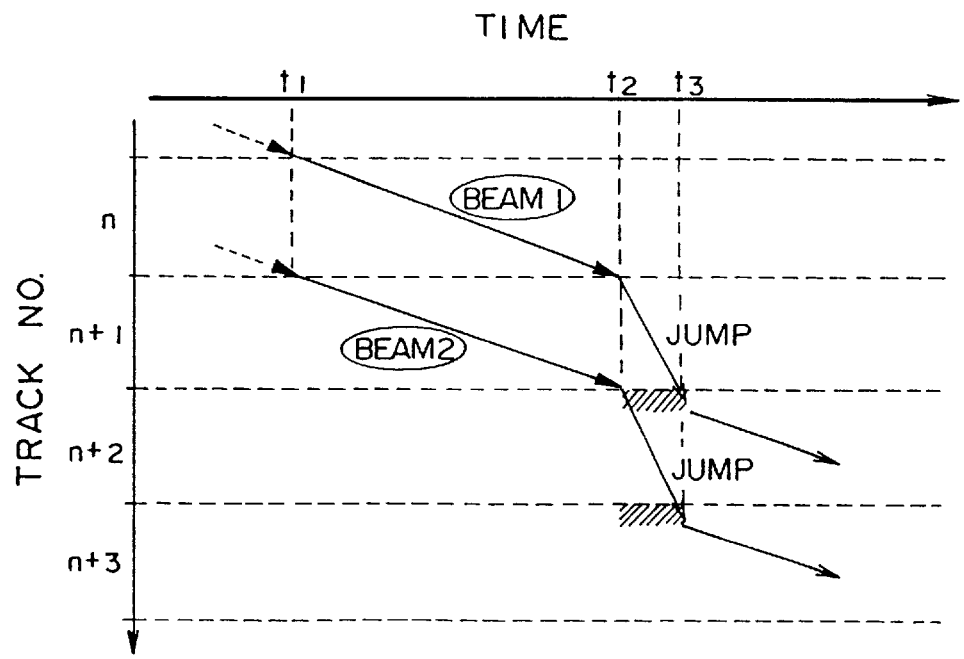
FIG. 4 is a schematic view showing movement of two light beams along the tracks with reference to elapsed time in a reproducing operation of a conventional optical disk record and reproduction apparatus.

As shown in FIG. 2, an information recording medium such as a recording disk 101 is rotated by a spindle motor 102, and an optical head 104 for recording or reproducing the information onto or from the recording disk 101 is moved in a radial direction of the recording disk 101 by a coarse actuator 103.

Figure 5:
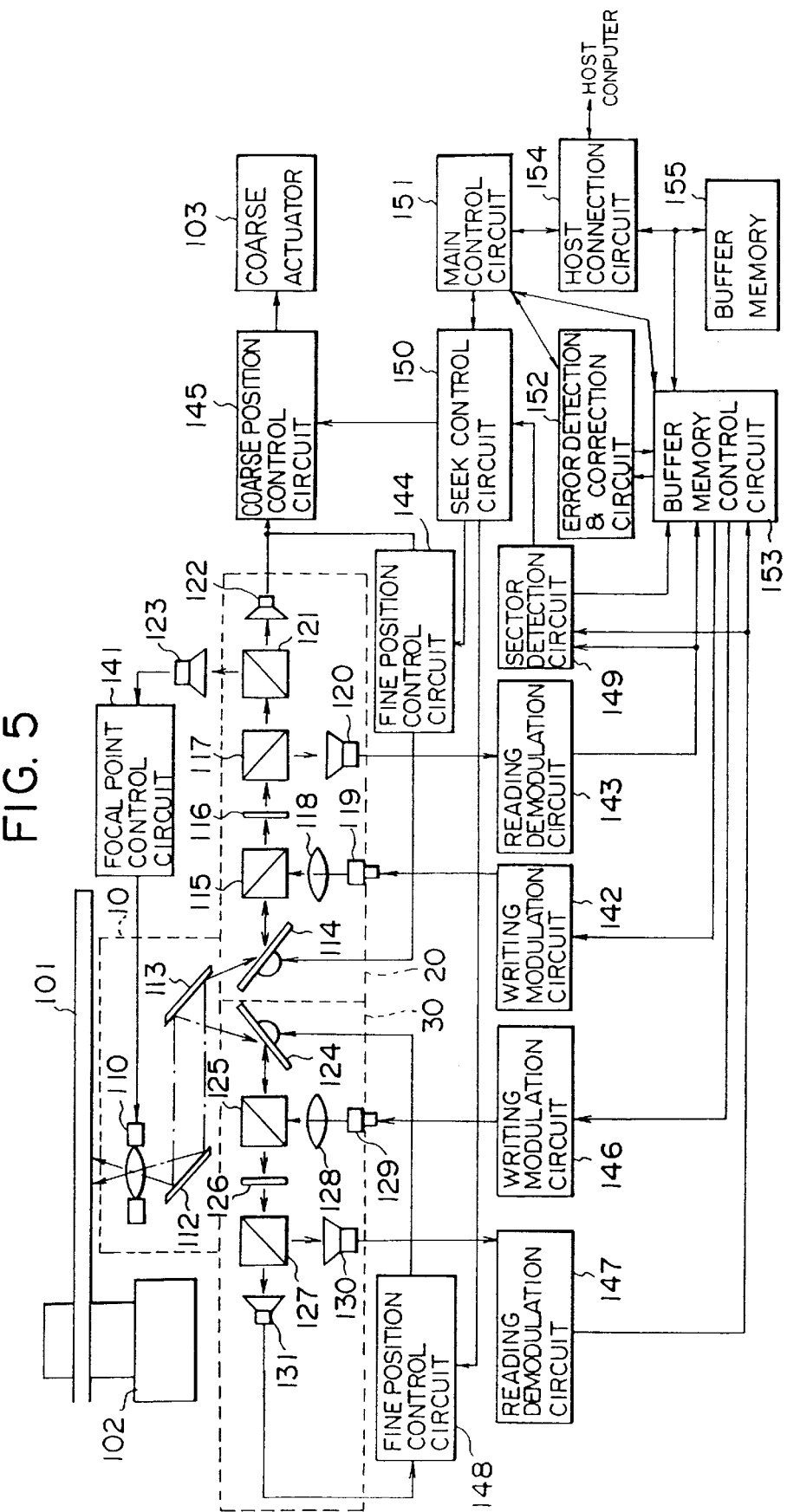
FIG. 5 is a schematic block diagram of the first embodiment of an optical disk record and reproduction apparatus according to the present invention.

In FIG. 5, there are shown components inside the optical head 104 and associated electronic circuits therefor. The optical head 104 includes a focus optical system 10, a first beam optical system 20 and a second beam optical system 30. The focus optical system 10 is composed of an objective lens 110 and two fixed mirrors 112 and 113. The first beam optical system 20 for outputting and detecting a first light beam (hereinafter referred to as beam 1 in short) is composed of a first galvanomirror 114, a first beam splitter 115, a first wavelength filter 116, a second beam splitter 117, a first coupling lens 118, a first laser diode 119, a first reproduction signal detector 120, a third beam splitter 121, a first position signal detector 122 and a focal point signal detector 123. The second beam optical system 30 for outputting and detecting a second light beam (hereinafter referred to as beam 2 in short) is composed of a second galvanomirror 124, a fourth beam splitter 125, a second wavelength filter 126, a fifth beam splitter 127, a second coupling lens 128, a second laser diode 129, a second reproduction signal detector 130 and a second position signal detector 131.

The first laser diode 119 emits a light beam having a wavelength of 0.78 $\mu$m, and the first wavelength filter 116 passes the light beam having the wavelength of 0.78 $\mu$m but does not pass a light beam having a wavelength of 0.83 $\mu$m. The second laser diode 129 emits a light beam having a wavelength of 0.83 $\mu$m, and the second wavelength filter 126 passes the light beam having the wavelength of 0.83 $\mu$m but does not pass a light beam having a wavelength of 0.78 $\mu$m. It is so controlled that beam 2 outputted by the second beam optical system 30 may be focused on the recording disk when beam 1 outputted by the first beam optical system 20 is focused on the recording disk. Thus, the light beams having the wavelength of 0.78 $\mu$m or 0.83 $\mu$m are dominated in the first and second beam optical system 20 and 30, respectively.

The whole electronic circuit is divided into a servo system circuit and a recording/reproducing system circuit. The servo system circuit includes two fine position control circuits 144 and 148 for driving the galvanomirrors 114 and 124 according to the position signals outputted by the position signal detectors 122 and 131 to carry out fine position controls of the light spots on the recording disk and jumping controls of the light spots between the tracks, a coarse position control circuit 145 for driving the coarse actuator 103 to carry out a movement control of the optical head 104, and a focal point control circuit 141 for driving the objective lenses 110 according to the signal outputted by the focal point signal detector 123 to focus the light beam on the recording disk 101 and a seek control circuit 150 for controlling seek operation and starting operation of jumps.

The recording/reproducing system circuit includes two writing modulation circuits 142 and 146 for modulating the digital data into recording data to drive the laser diodes 119 and 129, two reading demodulation circuits 143 and 147 for converting the signals outputted by the reproduction signal detectors 120 and 130 into digital data, a sector detection circuit 149 for checking up ID (identification) of the reproduced sectors, an error detection and correction circuit 152 for adding an error detection code to the recording data and carrying out an error detection and correction of the reproduced data, a buffer memory 155 for temporarily storing the recording or reproduced data, a host connection circuit 154 for communicating data and instructions with a host computer (not shown), a buffer memory control circuit 153 for controlling the communication of data among the buffer memory 155 and the host connection circuit 154 and the writing modulation circuits 142 and 146 and the reading demodulation circuits 143 and 147, and a main control circuit 151 for interpreting the instructions fed from the host computer and controlling the entire system.

Figure 6:
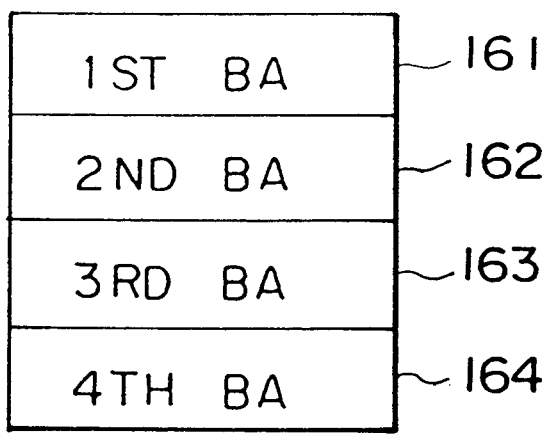
FIG. 6 is a schematic view showing a structure of a buffer memory shown in FIG. 5.

In FIG. 6, there is shown a structure of the buffer memory 155 which is divided into four equal areas such as first, second, third and fourth buffer areas (hereinafter referred to as BAs) 161, 162, 163 and 164. Each BA has a capacity for storing one track of data and all the BAs act as a ring buffer for a host.

Figure 7:
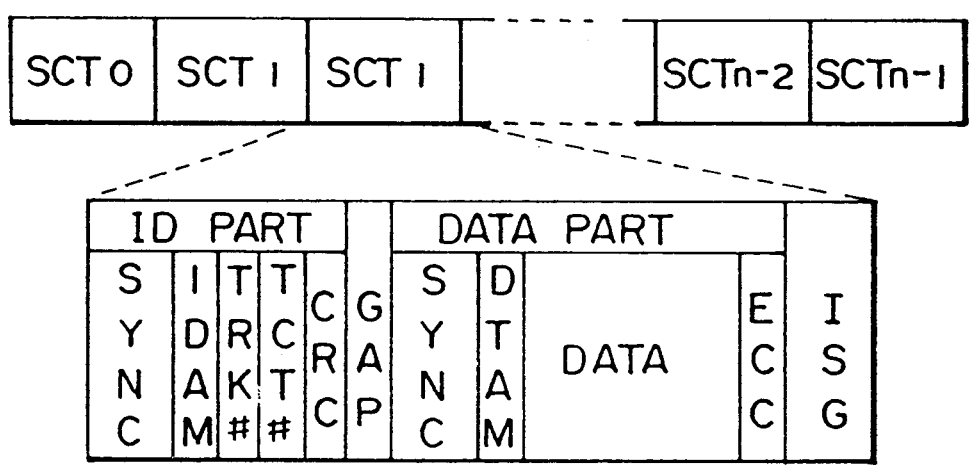
FIG. 7 is a schematic view showing one track having sectors therein of the recording disk.

In FIG. 7, there is shown one example of one track which is divided into n sectors from SCT0 to SCTn−1. Each sector is divided into an ID part, a DATA part, a GAP between the ID part and DATA part, and a GAP or ISG between the sectors. The ID part and the DATA part each is provided with a SYNC in their head portion. In the ID part, the SYNC is followed by an IDAM for representing the ID part, a TRK# for representing the track number, a SCT# for representing the sector number, and a CRC for use in detecting an error of reproduction. In the DATA part, the SYNC is followed by a DTAM for representing the DATA part, DATA for recording data therein and an ECC for carrying out error detection and correction of data in reproducing.

Figure 8:
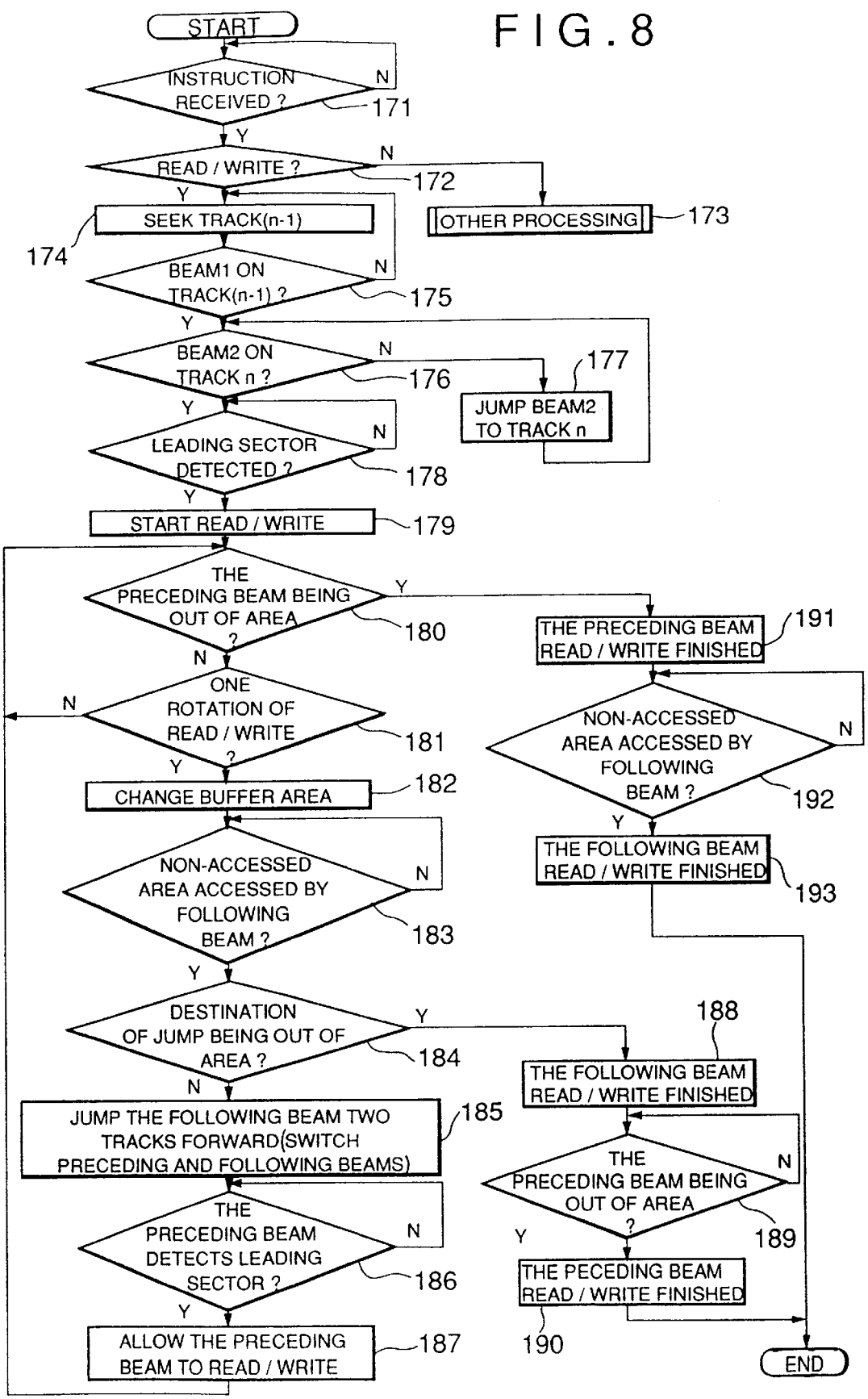
FIG. 8 is a flow chart of light beam movement in normal recording and reproducing operations according to the present invention.

Then, the recording operation of the optical disk record and reproduction apparatus according to the present invention will now be described in detail in connection with FIGS. 1 and 8. FIG. 1 schematically illustrates the movement of the light beams and the flow of the data outputted from the data buffer in the recording operation. FIG. 8 shows a flow chart exhibiting an algorithm of the movement of the light beams.

As shown in FIG. 8, upon receipt of an instruction from the host computer in step 171, the main control circuit 151 decodes the instruction in step 172. When the instruction is neither a read nor write instruction, the instruction is executed in step 173. If the instruction is a write instruction, the main control circuit 151 gives track numbers to be sought to the seek control circuit 150, and the seek control circuit 150 causes the coarse position control circuit 145 to actuate the coarse position actuator 103 for seek operation of beam 1 and beam 2 in step 174. For example, for the explanation, this instruction is assumed to be an instruction for writing data to tracks from the track n to the track n+6 shown in FIG. 1. As shown in FIG. 1, at time t10 beam 1 starts to seek the track n−1 and beam 2 starts to seek the track n from the track k+1. The seek control circuit 150 continues the seeking until beam 1 reaches the track n−1 in step 175. When beam 1 reaches the track n−1, the seek control circuit 150 checks if beam 2 has reached the track n in step 176. If beam 2 has not reached to the track n yet, the seek control circuit 150 makes the fine position control circuit 148 to actuate the second galvanomirror 124 so as to jump beam 2 to the track n in step 177.

From time t11 (FIG. 1) in the course of the seeking operation, the receiving of data outputted from the host computer is started, and the recording data is stored sequentially from the first BA 161 to the last BA 164 in the buffer memory 155.

When beam 1 reaches the track n−1 and beam 2 reaches the track n, the sector detection circuit 149 starts to search a recording start sector by using the output signals from the reading demodulation circuits 143 and 147 in step 178. When the recording start sector is detected at time t12 in FIG. 1, the data recording is started in step 179. The data stored in the first BA 161 of the buffer memory 155 is transferred to the writing modulation circuit 142 by the buffer memory control circuit 153 and are recorded on the track n by beam 1 through the first laser diode 119. In parallel with this, the data stored in the second BA 162 of the buffer memory 155 is transferred to the writing modulation circuit 146 and is recorded on the track n+1 by beam 2 through the second laser diode 129.

At time t13, beam 1 finishes the recording of one track of data in step 181 to reach the track n+1 on which beam 2 has already recorded the data, in step 183. Then, the seek control circuit 150 causes the fine position control circuit 144 to actuate the first galvanomirror 114 so as to jump beam 1 two tracks ahead to the track n+3 beyond the track on which beam 2 has recorded the data, in step 185. At the same time, at the time t13, the buffer memory control circuit 153 switches the source of the data to be sent to the writing modulation circuit 146 from the second BA 162 to the third BA 163 of the buffer memory 155 in step 182 while beam 2 continues to record data on the track n+2.

When the recording data transfer from the host computer to the fourth BA 164 has been finished, the recording data is stored again sequentially from the first BA 161. At this moment, the data firstly stored in the first and second BAs 161 and 162 have been recorded on the recording disk 101.

At time t14, when beam 1 finishes the jumping from the track n+1 to the track n+3 and detects the head or leading edge of any sector on the track n+3 in step 186, beam 1 starts to record the data from the sector whose head is detected, in step 187. At this time, the buffer memory control circuit 153 starts to transfer the data stored in the fourth BA 164 from a part corresponding to the first detected sector for beam 1 to the writing modulation circuit 143.

At time t15, when beam 2 has finished the recording of the data on the track n+2 in step 181, the buffer memory control circuit 153 starts to transfer data stored in the fourth BA 164 from its head to the writing modulation circuit 143 in step 182 while beam 2 still continues to record data on a portion 40 of the track n+3, which is left or not recorded by beam 1 during the jumping from the track n+1 to the track n+3.

At time t16, when beam 2 has reached the head of the area on which beam 1 finished recording, in step 183, the seek control circuit 150 causes the fine position control circuit 148 to actuate the second galvanomirror 124 so as to jump beam 2 two tracks ahead to the track n+5 in step 185.

At time t17, when beam 2 has finished the jumping from the track n+3 to the track n+5 and detects the head of any sector on the track n+5 in step 186, beam 2 starts to record the data from the sector whose head is detected, in step 187. At this time, like in the time t14, the buffer memory control circuit 153 starts to transfer the data stored in the fourth BA 164 from its part corresponding to the detected sector for beam 2 to the writing modulation circuit 143. Even after having finished the recording of data on the track n+4, beam 1 still continues to record the data on another portion 50 of the track n+5, which is left or not recorded by beam 2 during the jumping from the track n+3 to the track n+5.

At time t18, when beam 1 has reached the head of the area on which beam 2 finished recording, in step 183, since the track n+7 of two tracks ahead is out of the areas to be recorded in step 184, no jumping of beam 1 is carried out to stop the writing or recording operation of beam 1 in step 188.

At time t19, beam 2 finishes the recording of data on the track n+6. Thus, the recording of all seven tracks from the track n to the track n+6 is finished in step 189, and the writing or recording operation of beam 2 is finished in step 190 to finish the processing of the write instruction. In case of an even number of tracks to be recorded, a preceding beam reaches earlier out of the recording areas to be recorded in step 180 and finishes earlier the writing operation in step 191, and then the following beam reaches the recording end area in step 192. Then, the following beam finishes the writing operation in step 193, and thus the write instruction operation is all finished.

Although the moving operation of the light beams in the recording operation has been described as above, when no error occurs, the moving operation of the light beams such as beam 1 and beam 2 in the reproducing operation can be carried out in the same manner as the recording operation except that the direction of the data transfer is reversed, and thus the description of the reproducing operation is omitted for brevity. Although the recording has been carried out from the areas starting from the head of the track, however, of course, the recording as well as the reproducing can be carried out to start from the head of any sector of any track.

Figure 9:
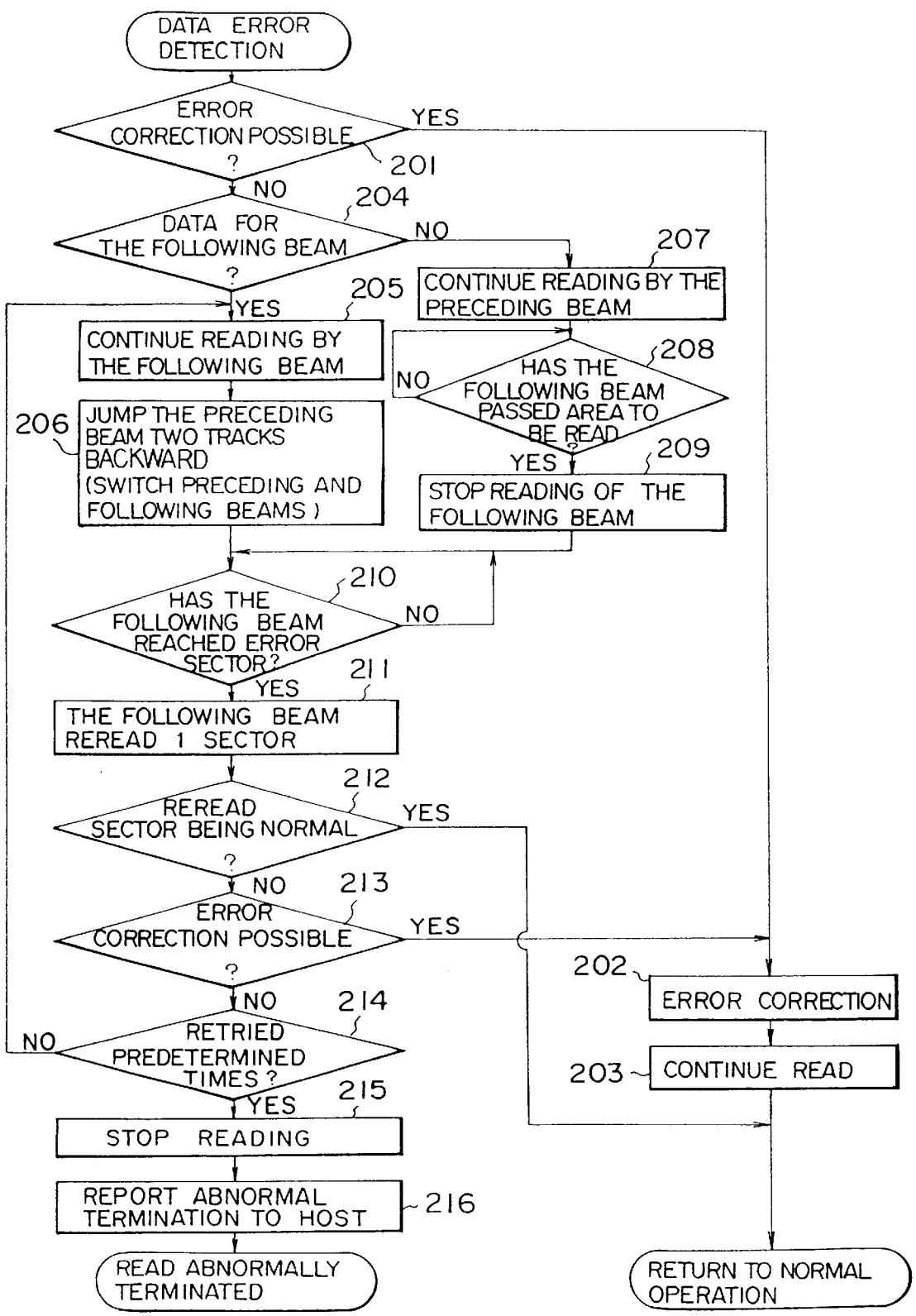
FIG. 9 is a flow chart of light beam movement in a reproducing operation including an error data detection processing according to the present invention.
Figure 10:
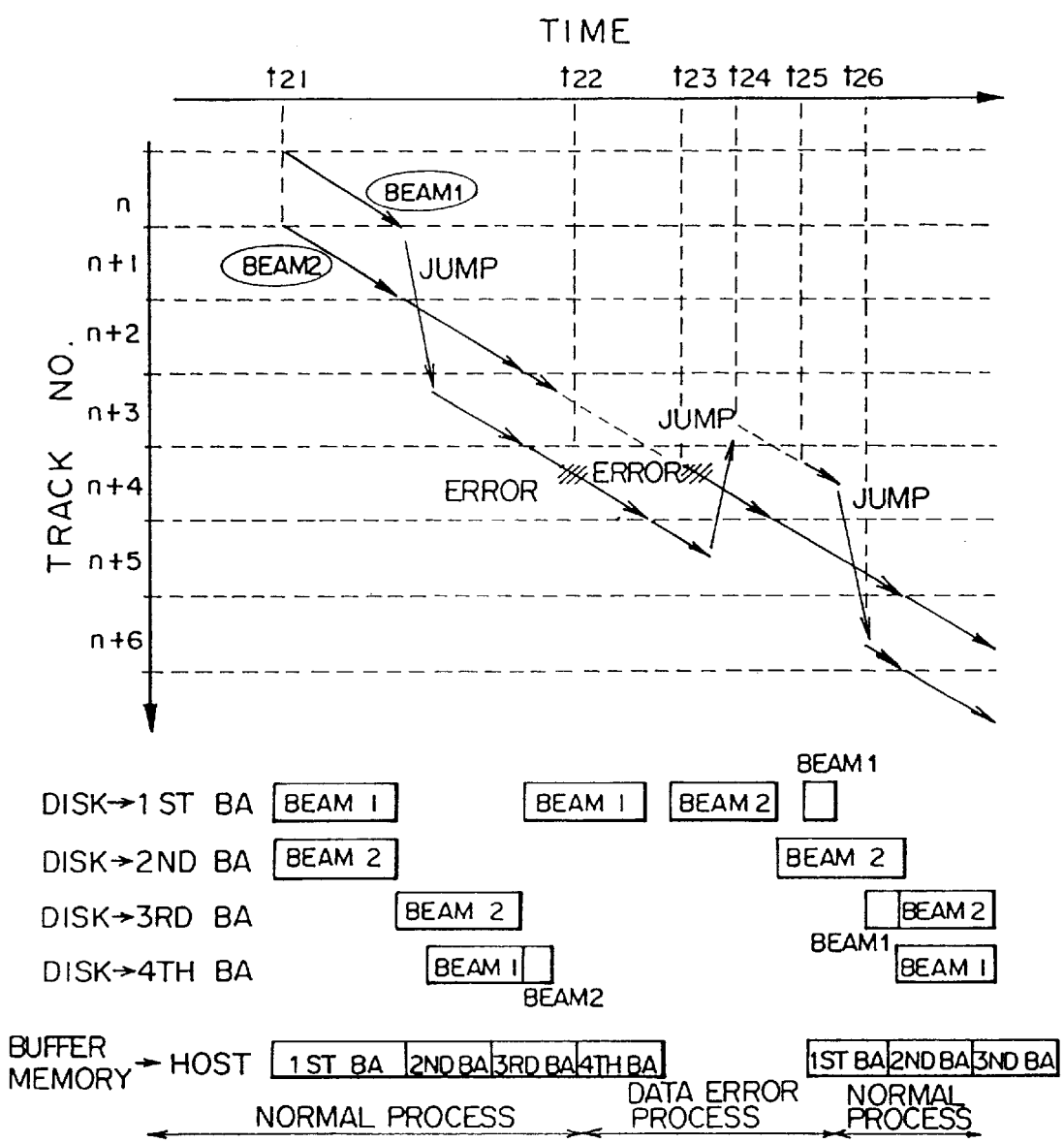
FIG. 10 is a schematic view showing movement of two light beams along the tracks with reference to elapsed time in a reproducing operation including an error data detection processing in the first embodiment of an optical disk record and reproduction apparatus according to the present invention.

Referring next to FIGS. 9 and 10, the movement of the light beams in a reproducing operation including an error data detection in the optical disk record and reproduction apparatus according to the present invention will be described in detail. FIG. 9 is a flow chart showing an algorithm of the movement of light beams when an error is detected. FIG. 10 illustrates the movement of the light beams and the flow of data outputted from the data buffer in the reproducing operation including an error data detection. In the drawings, at time t21, data reproduction is started such that data is reproduced by beam 1 from the track n and is transferred to the first BA 161 of the buffer memory 155 while another data is reproduced by beam 2 from the track n+1 and is transferred to the second BA 162 of the buffer memory 155. Then, beam 1 jumps from the track n+1 to the track n+3 in the same manner as shown in FIG. 1.

At time t22, when an error of the reproduced data is detected by the error detection and correction circuit 152, a data error processing is started. If the error detection and correction circuit 152 discriminates that the error correction is possible in step 201, the error of the reproduced data is corrected in step 202, and the reading operation is continued in step 203 to return to the normal operation. If the error correction is impossible, the data is read again as follows. Firstly, it is discriminated on which one of beam 1 and beam 2 the error occurred in the data reproduced in step 204. In this instance, since the data having an error detected at the time t22 is reproduced by the preceding beam 1 in step 204, the reading by beam 1 is continued in step 207. The following beam or beam 2 continues the reading until it reaches the head of the area which beam 1 finished its reproducing, in step 208. Having reached the head of the area which beam 1 finished the reproducing, beam 2 does not jump and temporarily stops the reading in step 209.

At time t23, when beam 2 has reached the sector including the error of the reproduced data in step 210, beam 2 rereads the error sector in step 211. If no error is detected in the rereading of the sector in step 212, beam 2 is returned to the normal operation. When the error is detected again by rereading the error sector in step 212 and the error correction is possible in step 213, the error correction of the reproduced data is carried out in step 202, and beam 2 continues the reading in step 203 to return to the normal operation. If the error correction is still impossible in step 213, the data error processing is continued. However, when an incorrigible error is still detected in step 214 even after the rereading is repeated at the predetermined number of times of retries, the reading is stopped in step 215. Then, abnormal termination is reported to the host through the host connection circuit 154 at step 216, and the reading instruction operation is stopped. When an incorrigible error is detected in the data reread at the time t23 in step 213 and the number of times of the retries is less than the predetermined number in step 214, the rereading by beam 2 is continued in step 205, and beam 1 jumped to return to the track n+3 in step 206. At this moment, although the data of the tracks n+4 and n+5 has already been reproduced by beam 1 and are stored in the first and second BAs 161 and 162, the BAs are rewritten with the data reproduced by beam 2.

At time t24, beam 1 reaches the track n+3, and waits until it reaches the error sector in step 210. At time t25, beam 1 reads again the error sector, and the reproduced data is transferred to the corresponding portion of the first BA 161. If no error is detected in the reproduced data in step 212, beam 1 is returned to the normal operation. Since the data reproducing of the track n+4 has already been finished, at the time t26, beam 1 is jumped to the track n+6 to continue the reading.

Figure 11:
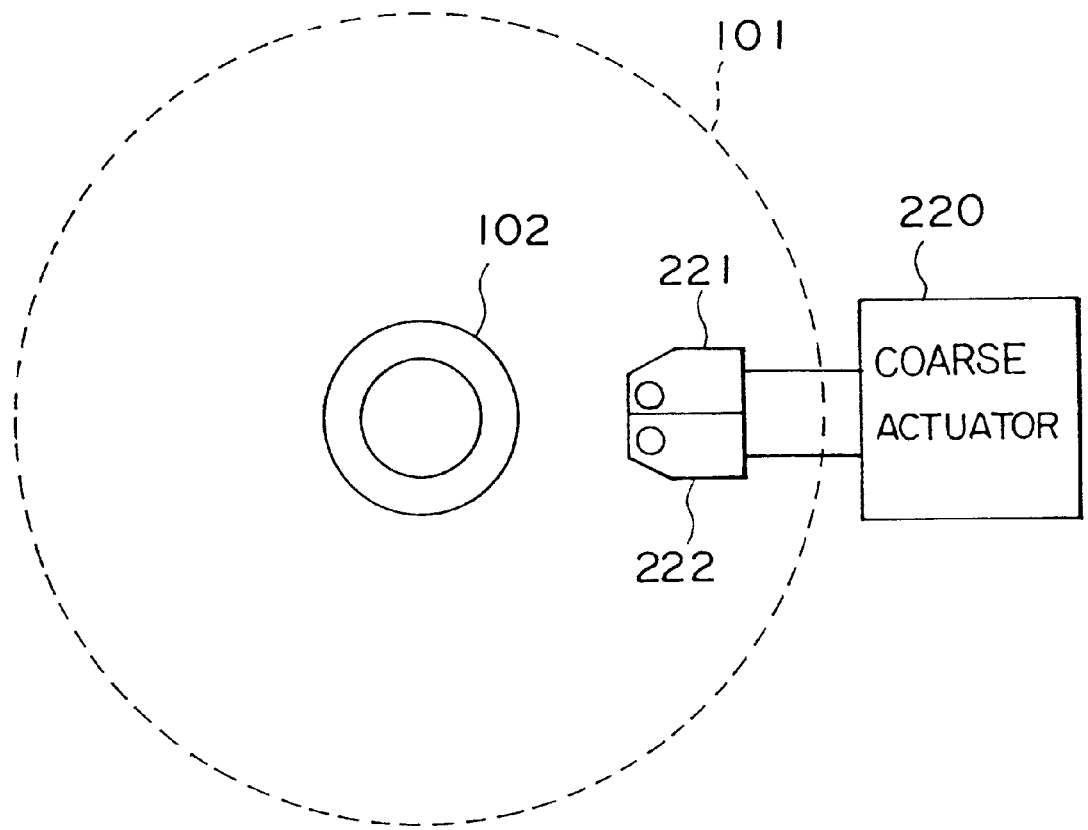
FIG. 11 is a schematic top view of a modified optical head used in the first embodiment.
Figure 12:
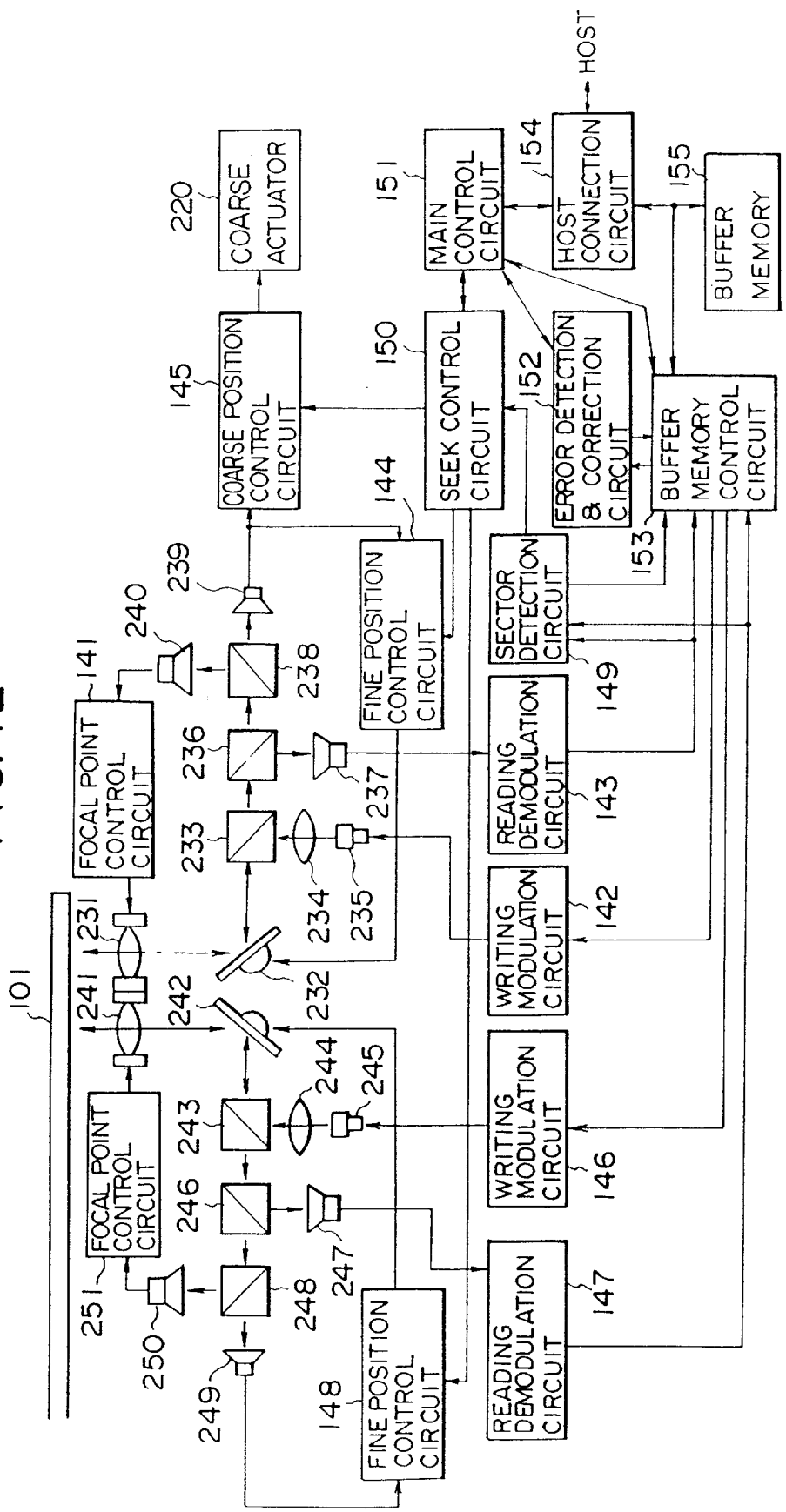
FIG. 12 is a schematic block diagram of the second embodiment of an optical disk record and reproduction apparatus according to the present invention.

In FIGS. 11 and 12, there is shown another optical disk record and reproduction apparatus according to the present invention, having the same structure as the first embodiment shown in FIGS. 2 and 5 except an optical head device. FIG. 11 shows a recording disk 101 fitted on a spindle motor 102 and the optical head device having first and second optical heads 221 and 222 which are moved by a common coarse actuator 220. FIG. 12 shows components inside the first and second optical heads 221 and 222 and associated electronic circuits therefor.

As shown in FIG. 12, the first optical head 221 comprises a first objective lens 231, a first galvanomirror 232, a first beam splitter 233, a first coupling lens 234, a first laser diode 235, a second beam splitter 236, a first reproduction signal detector 237, a third beam splitter 238, a first position signal detector 239 and a first focal point signal detector 240. The second optical head 222 comprises a second objective lens 241, a second galvanomirror 242, a fourth beam splitter 243, a second coupling lens 244, a second laser diode 245, a fifth beam splitter 246, a second reproduction signal detector 247, a sixth beam splitter 248, a second position signal detector 249 and a second focal point signal detector 250.

The electronic circuits have the same structure as that shown in FIG. 5 except that a second focal point control circuit 251 for driving the second objective lens 241 according to the signal output by the second focal point signal detector 250 to focus the second light beam on the recording disk 101 is added to the servo system circuit.

As described above, in the first embodiment, data can be recorded onto or reproduced from a conventional recording disk having one spiral recording track by using two light beams in parallel, and the recording and reproducing operation speed can be increased almost twice as compared with the conventional apparatus. Further, when the error of reproduced data is detected, in parallel with the reproducing operation of normal data, the error detected sector can be reread to ensure the reliability of the data and to improve the reproducing speed.

Figure 13:
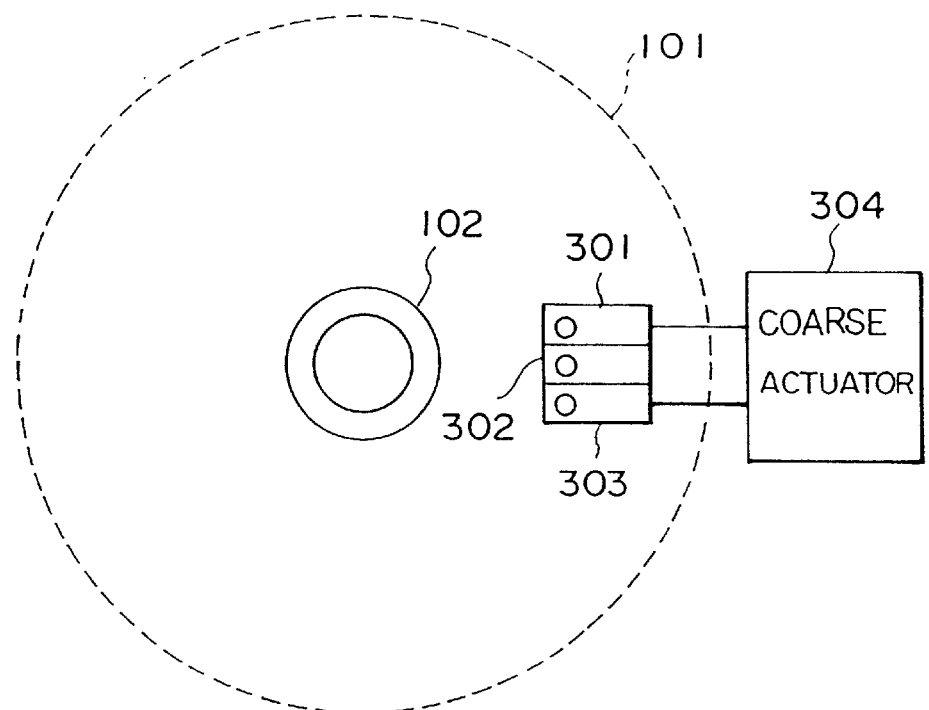
FIG. 13 is a schematic top view of a further optical head used in a second embodiment of an optical disk record and reproduction apparatus according to the present invention.
Figure 14:
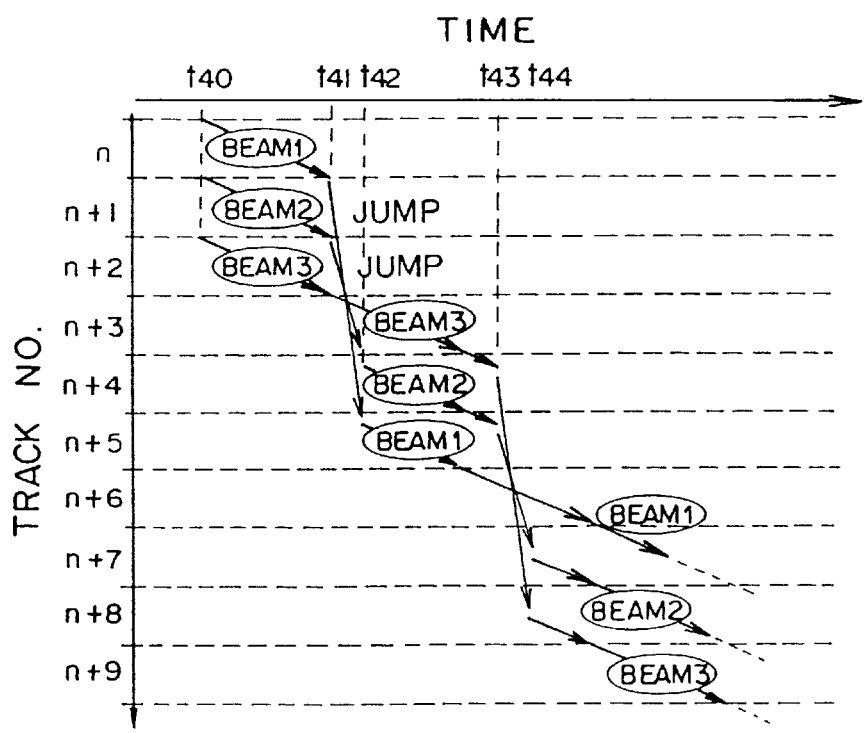
FIG. 14 is a schematic view showing movement of three light beams along the tracks with reference to elapsed time in a reproducing operation in the second embodiment.
Figure 15:
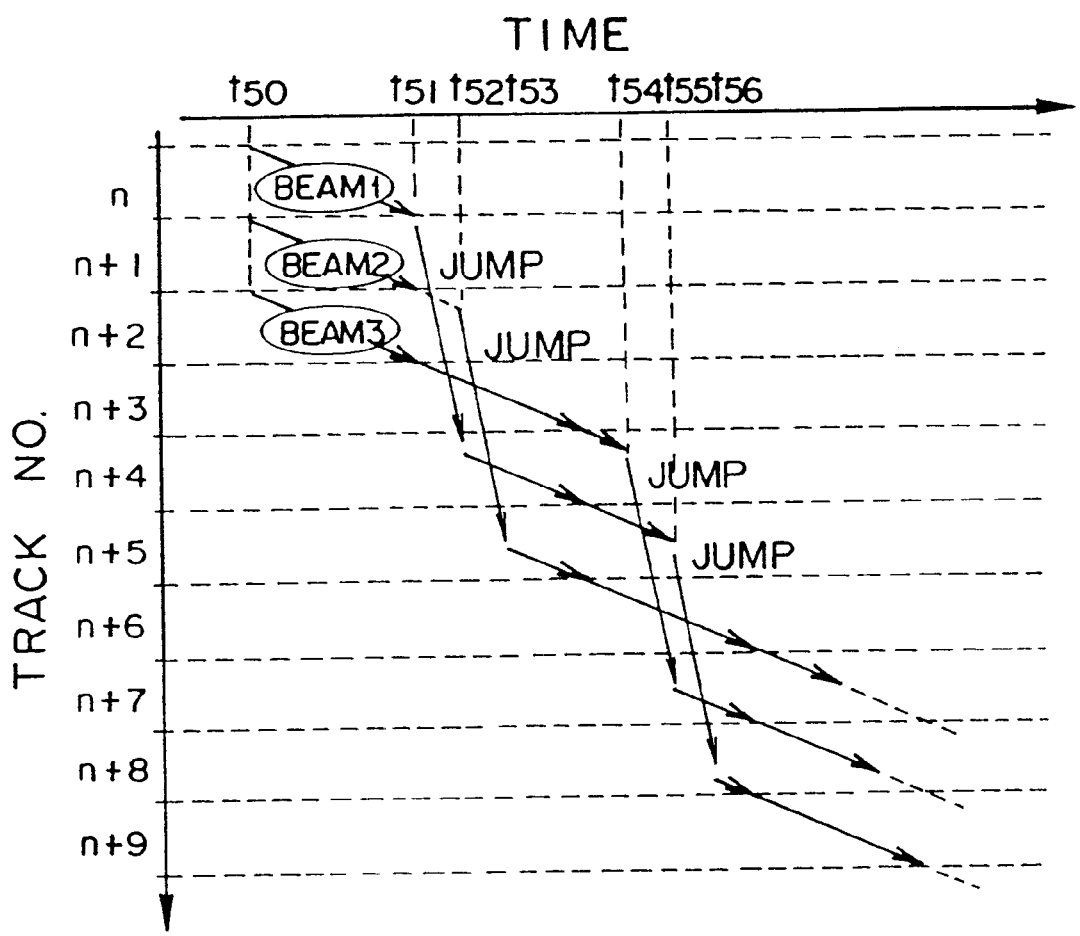
FIG. 15 is a schematic view showing another movement of three light beams along the tracks with reference to elapsed time in a reproducing operation in the second embodiment.

In FIGS. 13 to 15, there is shown a second embodiment of an optical disk record and reproduction apparatus according to the present invention, having the same construction as the embodiment shown in FIGS. 11 and 12 except that an optical head device includes three optical heads for three light beams. FIG. 13 shows a recording disk 101 fitted on a spindle motor 102 and the optical head device having first, second and third optical heads 301, 302 and 303 which are moved by a common coarse actuator 304. A structure of the component inside the three optical heads 301 to 303 and associated electronic circuits is the same as that shown in FIG. 12 except that the third optical head is added. FIGS. 14 and 15 show the moving operations of the three light beams and the flow of data outputted from the data buffer in the recording or reproducing operation.

The first moving method of the three light beams will be described in connection with FIG. 14. At time t40, beam 1, beam 2 and beam 3 start to read the tracks n, n+1 and n+2, respectively, at the same time. At time t41, when beam 1 and beam 2 finish the reading of the tracks n and n+1, respectively, at the same time, beam 1 and beam 2 are jumped from the tracks n+1 and n+2 to the tracks n+5 and n+4, respectively, while beam 3 continues the reading of the track n+3. At time t42, when the jumping of beam 1 and beam 2 is completed, beam 1 and beam 2 restart to read the tracks n+5 and n+4, respectively.

At time t43, when beam 3 reaches the head of the area that beam 2 has finished reading and beam 2 reaches the head of the area that beam 1 has finished reading, beam 3 and beam 2 jump to the tracks n+8 and n+7, respectively, while beam 1 continues the reading of the track n+6. At time t44, when the jumping of beam 3 and beam 2 is finished, beam 3 and beam 2 restart to read the tracks n+8 and n+7, respectively. Then, the reading and jumping are repeated in the same manner as described above to read the areas to be read. The writing operation is also carried out in the same manner as described above, and the explanation thereof is omitted for brevity.

FIG. 15 shows the second moving method of the three light beams. At time t50, beam 1, beam 2 and beam 3 start to read the tracks n, n+1 and n+2, respectively, at the same time. At time t51, beam 1, beam 2 and beam 3 finish the reading of one track of data and reach the tracks n+1, n+2 and n+3, respectively, but the tracks n+1 and n+2 are already read by beam 2 and beam 3, respectively.

At the time t51, beam 1 jumps to the n+4, and beam 2 temporarily stops the reading of the track n+2 while beam 3 continues the reading of the, track n+3. After completion of the jumping of beam 1, at time t52, beam 2 jumps to the track n+5. Then, the reading and jumping are repeated in the same manner as described above. The writing operation is also performed in the same manner as described above. In this manner of jumping, the jumping timings of the light beams are changed or shifted so as not to carry out jumping of two or more beams at the same time to reduce the maximum electric power consumption.

As described above, in the second embodiment, data can be recorded or reproduced in parallel onto or from a conventional recording disk having one spiral recording track by using three light beams, and the recording and reproducing operation speed can be increased approximately thrice as compared with the conventional apparatus.

As described above, according to the present invention, an area not recorded or reproduced during jumping of one light beam can be recorded or reproduced by another light beam on a conventional optical recording disk, and hence an optical disk recording and reproducing operation speed can be largely increased.

Further, when there is an error in data reproduced by one light beam, the read operation can be retried to such an error by another light beam moved to an error sector while other light beam can continue the processing in parallel. Hence, a recording disk which is apt to cause errors can be recorded or reproduced with improved operation efficiency and operation speed.

Although the present invention has been described in its preferred embodiments with reference to the accompanying drawings, it readily understood that the present invention is not restricted to the preferred embodiments and that various changes and modifications can be made by those skilled in the art without departing from the spirit and scope of the present invention.

What is claimed is:

1. An optical disk record and reproduction apparatus, comprising:
   means for generating at least two light beams;
   concentrating means for concentrating the light beams on at least two different positions of a recording medium; and
   moving means for moving the positions of the light beams independently of each other across recording tracks on the recording medium, any one of the light beams being movable so as to jump over another light beam during recording or reproducing of data by the another light beam.

2. The apparatus of claim 1, wherein said concentrating means includes a set of objective lenses.

3. The apparatus of claim 2, wherein said moving means includes first and second moving devices having different moving accuracies, and the first moving device having a coarser moving accuracy is used in common for moving two or more light beams.

4. The apparatus of claim 2, further comprising means for carry out a seek of one light beam to a position beyond another light beam when said one light beam reaches an area already recorded or reproduced by another light beam during recording or reproducing a plurality of different areas the recording medium by said plurality of light beams.

5. The apparatus of claim 2, wherein the set of objective lenses enables the at least two light beams to be concentrated on at least two different positions of the recording medium.

6. The apparatus of claim 1, wherein said moving means includes first and second moving devices having different moving accuracies, and the first moving device having a coarser moving accuracy is used in common for moving two or more light beams.

7. The apparatus of claim 1, wherein said recording medium has thereon a plurality of tracks which constitute a continuous spiral line on the recording medium.

8. The apparatus of claim 1, further comprising means for carry out a seek of one light beam to a position beyond another light beam when said one light beam reaches an area already recorded or reproduced by said another light beam during recording or reproducing a plurality of different areas the recording medium by said plurality of light beams.

9. The apparatus of claim 1, further comprising means for detecting an error in reproduced data along with an error position, and means for reproducing again data from the error position by another light beam.

10. The apparatus of claim 1, wherein the moving means enables any one of the light beams to jump over another of the light beams alternately during reproducing or recording of data on successive tracks of the recording medium.

11. The apparatus of claim 1, further comprising means for detecting an error in reproduced data along with an error position thereof with one light beam which is following another light beam, and means for reproducing data from the error position by positioning the another light beam to the error position for retrying the reproducing of the data.

12. The apparatus of claim 1, further comprising means for detecting an error in reproduced data along with an error position with one light beam which another light beam is following, the another light beam continuing to reproduce data without making a jump even when the another light beam reaches an area already reproduced by the one light beam.

13. A multibeam optical disk record and reproduction method, comprising the steps of:
   generating at least two light beams;
   concentrating the light beams on different positions of a plurality of recording tracks formed in a spiral line on a recording medium to record or reproduce data to or from the recording medium on the different positions at the same time;
   moving the light beams independently of each other on the recording medium; and
   shifting jumping timings of the light beams from one another to prevent occurrence of jumps of two or more light beams at the same time.

14. The method of claim 13, wherein the light beams are concentrated on adjacent recording tracks, and a seek of one light beam is carried out to a position beyond a position of another light beam when said one light beam reaches an area already recorded or reproduced by said another light beam during recording or reproducing a plurality of different areas of the recording track by a plurality of light beams.

15. The method of claim 14, wherein the recording or reproducing of data is carried out by at least three light beams.

16. The method of claim 13, wherein, when an error is detected in data reproduced by one light beam, the data is reproduced again from the error position by another light beam.

17. The method of claim 13, wherein, when an error and a position thereof is detected in data reproduced by one light beam which is following another light beam, the another light beam is positioned to the detected error position to retry the reproducing of the data.

18. The method of claim 13, wherein, when an error and a position thereof is detected in data reproduced by one light beam which another light beam is following, the another light beam continues to reproduce data without effecting a jump even when the another light beam reaches an area already reproduced with the one light beam.

* * * * *